United States Patent

Nyako et al.

[11] Patent Number: 5,934,813
[45] Date of Patent: Aug. 10, 1999

[54] KEYBOARD PROTECTOR HAVING PEAKED CONFIGURATION

[76] Inventors: Frank Nyako; Dottie Nyako, both of 186 Long Key Rd., Key Largo, Fla. 33037

[21] Appl. No.: 08/929,332

[22] Filed: Aug. 30, 1997

[51] Int. Cl.⁶ .................................................. B41J 29/12
[52] U.S. Cl. ..................................... 400/714; 312/208.3
[58] Field of Search ................................. 400/714, 713, 400/691; 312/208.1, 208.3, 284; 434/227

[56] References Cited

U.S. PATENT DOCUMENTS

| | | | |
|---|---|---|---|
| D. 342,944 | 1/1994 | Rhodes .................................. | D14/114 |
| 1,300,780 | 4/1919 | Rowan .................................. | 312/208.3 |
| 4,294,557 | 10/1981 | Blanchard et al. ..................... | 400/714 |
| 4,449,763 | 5/1984 | Barnett .................................. | 400/714 |
| 4,671,688 | 6/1987 | Brashears .............................. | 400/714 |
| 5,096,317 | 3/1992 | Phillippe .............................. | 400/714 |
| 5,383,643 | 1/1995 | Koch ..................................... | 400/714 |
| 5,400,903 | 3/1995 | Cooley .................................. | 206/320 |
| 5,419,704 | 5/1995 | North .................................... | 400/714 |

*Primary Examiner*—Edgar Burr
*Assistant Examiner*—Leslie Grohusky
*Attorney, Agent, or Firm*—Malloy & Malloy, P.A.

[57] ABSTRACT

A protective cover structure specifically designed to overlie and at least partially cover a keyboard of a computer and including an overlying top portion having a nonplaner configuration. A front face of the cover structure has an open construction or configuration of sufficient dimension to allow the user hands clear access to the keyboard for manipulation thereof during normal operation of the computer. The protective structure is at least partially formed from transparent material to allow viewing of the keyboard as well as the hands of the user when the subject assembly is in its protective, overlying position.

17 Claims, 1 Drawing Sheet

KEYBOARD PROTECTOR HAVING PEAKED CONFIGURATION

BACKGROUND OF THE INVENTION

1. Field of the Invention

The present invention is directed towards a protective cover dimensioned and configured to overlie the keyboard of a computer while enabling the user of the computer to have free access thereto. Pets such as cats or the like are thereby prohibited from inadvertently walking or jumping on the keys of the keyboard both during operation of the computer and during periods of non-use.

2. Description of the Related Art

It is well understood among pet owners and particularly those individuals who are attracted to cats that in spite of the beneficial relationship existing between an owner and his pet, there are certain inconveniences or annoyances frequently associated with living and caring for such animals. Cats, particularly those of a curious or affectionate nature, frequently insist in occupying the same space or surrounding vicinity as the owner regardless of the activity in which the owner is involved. For example, it is quite common for a cat, of an affectionate nature to spring into the lap of the owner or caretaker while the individual is reading a newspaper or the like. Also, when not directly involved in the activities of the owner, cats in particular, frequently prowl their domain and in doing so interfere with household objects by either purposely or accidently displacing certain objects.

With the advent of the modern day personnel computer, the popularity thereof have increased to the point where almost a majority of the households and work places include some type of computer facility which includes a keyboard. This keyboard is normally operated from some type of table or horizontal work surface and whether the computer is being utilized or not the keyboard is generally left in an exposed position. These individuals who are pet owners and particularly cat lovers and also use some type of computer instrument involving a keyboard have encountered the problem of having cats generally prowl across the keyboard and/or position themselves firmly on the keyboard thereby disturbing the operation thereof. In addition, cats of a particularly curious nature or those who have the habit of invading the operating area while their owners are working on the computer certainly have a disruptive affect on the operation and in fact, could, in certain instances, destroy certain work currently being performed on the computer.

Accordingly, there is a recognized need in this area to protect computer keyboards to the extent that pets, such as but not limited to cats, would be prevented from coming in contact with the keyboard. This protection should occur during periods when the computer is being used and the keyboard is being manipulated and also during periods of non-use. Moreover, a protector assembly should be of generally lightweight construction so as to be easily useable, even by children in the protection of the keyboard, while also making it substantially difficult for an animal to have access to the keyboard and/or remain in an obtrusive location relative to the keyboard. Further, such a device should also have sufficient stability such that investigation by a cat or other small animals would not serve to remove the protection, while allowing clear access to the keyboard by an individual in a manner that the user's hands are free to operate or manipulate the keyboard in the conventional fashion. Also, at least a portion of the overall assembly should be structured to allow clear, and unobstructed viewing of the entire operative surface of the keyboard during operation of the computer and utilization of the keyboard.

SUMMARY OF THE INVENTION

The present invention is directed towards a protector structure for a computer keyboard wherein any contact or disruption of the keyboard by pets, particularly cats, is prevented both during periods of use and nonuse. More specifically, the protector assembly of the present invention comprises a cover structure including a plurality of support members having their lower ends engaging the support surface on which the keyboard of the computer rests. The support members extend upwardly therefrom into a supporting engagement with a top portion of the cover structure. The number of support members may vary as well as the overall configuration of the cover structure. It is important to note since pets, particularly cats, sometimes have a curious nature, sufficient stability must be provided to the cover structure so as to prevent its inadvertent or purposeful displacement relative to the keyboard.

The top portion of the cover structure is such as to specifically include an outer exposed surface of a predetermined configuration that would be generally uncomfortable or preferably impossible if a cat or like pet attempted to walk on top of the cover portion or place himself there in a resting position. To this end, the top portion preferably comprises a plurality of panel segments arranged at an angular configuration to one another so as to configure the top portion into a somewhat "peaked" configuration. The relative angular orientation of the various panel segments may be such as to render it impossible, from a practical sense, for the cat or like household pet to climb and/or overlie the exposed surface of the top portion as when the animal is resting.

Another feature of the present invention is the front face of the cover structure having a generally open configuration or construction. Such opening should be sufficiently dimensioned to allow the hands of the user of the computer to comfortably fit underneath the cover structure when it is in its protective position and to allow free movement of the hands to properly manipulate the keyboard in the conventional fashion. The subject cover structure will thereby be maintained in its overlying, protective position thereby preventing any overly curious or affectionate animal from jumping or walking across the keyboard while it is being manipulated by the user.

Another preferred structural feature of the present invention, should enable the user of the keyboard to clearly view the keyboard as well as the movement of his hands on the keyboard during operation thereof. All this should be available to the user in a convenient manner without removing or dislodging the subject protector assembly when in its protective position. Therefore, the top portion, is formed at least in part from a transparent material. Such a transparent material is disposed in directly overlying relation to the keyboard and is of sufficient dimension and configuration to allow a clear viewing of the entire keyboard as well as movement and placement of the hands thereunder during use and operation thereof.

From the above, it should be apparent that the subject protector assembly can efficiently and effectively provide protection to the keyboard and prevent contact therewith of any cat or like pet even during periods of non-use or when the keyboard is being operated by a user of the computer.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
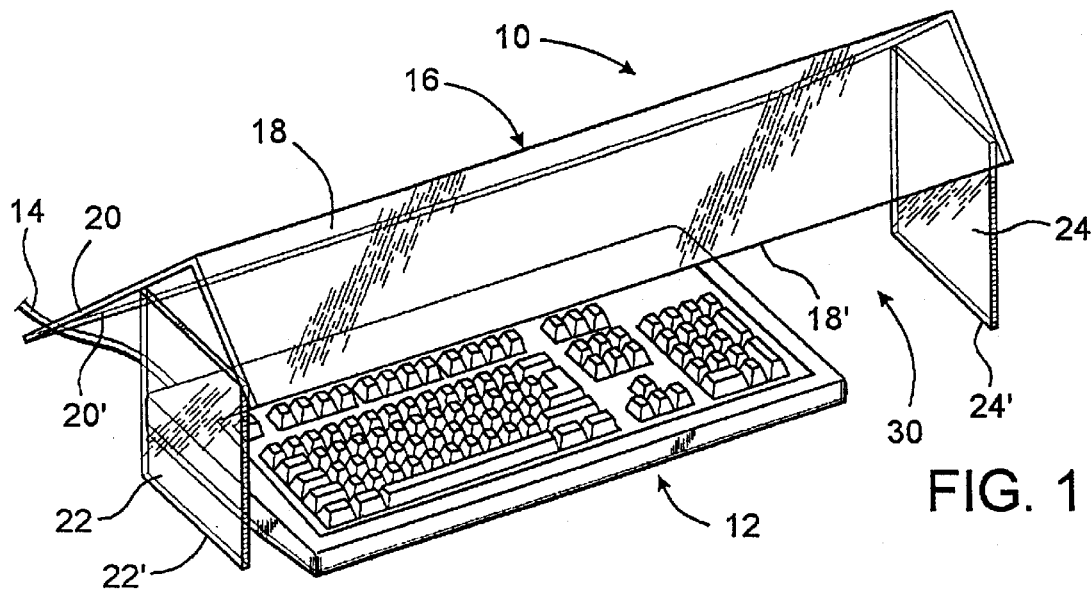
FIG. 1 in a perspective view of the protector assembly of the present invention in its protected position overlying a conventional keyboard.
Figure 2:
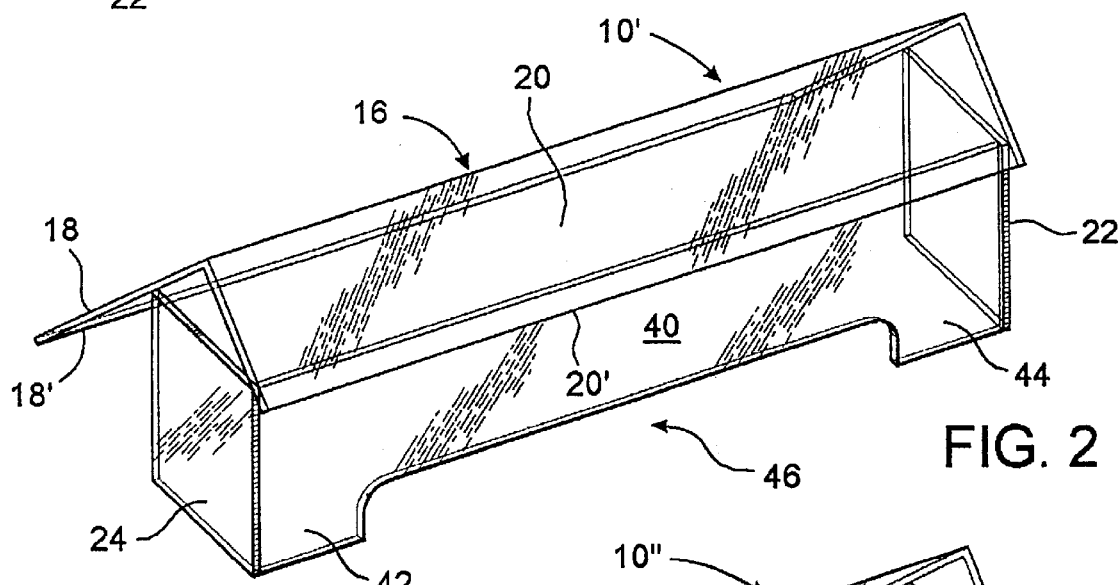
FIG. 2 is a rear perspective view of yet another embodiment of the protector assembly of the present invention.

As shown in FIGS. 1 and 2, the present invention is directed towards a protector assembly including a cover structure, generally indicated as 10. The protector assembly is preferably structured for use with a keyboard, generally indicated as 12, wherein the keyboard is of the type used to operate a conventional computer system (not shown for purposes of clarity). Moreover, the keyboard 12 is generally of the type wherein conventional electrical conduits, cables or the like are used to interconnect the keyboard to the CPU by any type of conventional connection as at 14.

The cover structure 10 includes a top portion generally indicated at 16. The top portion comprises a plurality of segments, more particularly described as panel segments including a front segment as at 18, and a rear segment as at 20. The segments 18 and 20 of the top portion 16 are disposed in raised, overlying relation to the keyboard by virtue of a support assembly such as the plurality of support members 22 and 24 of the figures. In the embodiment of FIG. 1, the support members 22 and 24 also define end walls of the cover structure 10 and may take on a variety of configurations which preferably at least partially close off access to the keyboard 12 through is the ends of the cover structure 12, as shown. The lower extremities of each of the end supports 22 and 24 as at 22' and 24' respectively, are designed to engage a supporting or work surface preferably upon which the keyboard 12 is positioned. Furthermore, the support members 22 and 24 extend upwardly from the surface into supporting engagement at their upper extremities with the top portion 16, including the frontal panel segment 18 and rear panel segment 20. It should be noted, particularly with regard to FIG. 2, that the support of the top portion 16 in its overlying, protective, covering position relative to the keyboard 12 can be accomplished by other structural support assemblies in order to provide proper stability to the cover structure 10 when in its protective, covering position.

Looking further to the top portion 16 of the cover structure 10, it is structured to provide a nonplaner, exposed outer surface configuration. More specifically, the first, frontal segment or panel 18 and second, rear segment or panel 20 are disposed at a predetermined angular orientation to one another so as to give the top portion 16 a somewhat "peaked" configuration. This configuration should make it impossible or at least quite uncomfortable for a pet such as, but not limited to a cat, to climb onto the top portion and/or rest/remain on the top portion 16 for any extended period of time. Indeed, it is noted that the peaked configuration along with a preferably smooth surface of the top portion 16 makes it difficult for an animal to remain balanced thereon without positioning themselves directly at the apex of the peaked configuration.

Another feature of the present invention is the provision of the front face generally indicated as 30 having a substantially open configuration. In the embodiment of FIG. 1 this front open face 30 is defined by the leading edge 18' of the frontal panel 18 being disposed in overhanging relation to the support surface or work surface on which the keyboard 12 is positioned. This entire open face should be sufficiently dimensioned and configured to allow clear and easy access by the hands of the user to the operative portions of the keyboard for proper and conventional operation of the computer. Also, the inner dimensions of the elongated protective cover 10, as well as the transverse dimensions thereof are such that the support members, regardless of the embodiment of the subject invention utilized, are disposed in outwardly spaced relation to the peripheral boundaries of the keyboard 12. This will provide ample room for conventional operation of the keyboard by the hands of the user while preventing a small household pet from having access to these operative portions. In the embodiment of FIG. 1, the rear panel as at 20 also has its lowermost edge 20' disposed in at least minimally spaced distance from the work surface on which the keyboard 12 is positioned. This distance between the lower edge 20' and the subject work surface should be sufficient to allow passage or positioning of the connecting cable 14 there beneath. Of course, a separate vertical support with an appropriate opening defined therein could also be incorporated as will be described subsequently.

Also in the preferred embodiment of the present invention, the frontal panel 18 of the top portion 16 includes a viewing area defined therein and structured to permit viewing of an underlying area therethrough when the cover structure 10 is in its covering position. While a series of apertures or other open area may be incorporated to provide the viewing area, in the preferred embodiment, the frontal panel is either entirely, or at least in part formed from a transparent material, such as a clear plastic. This transparent construction allows the user to clearly and effectively view the keyboard, in its entirety, during periods of both use and nonuse such that the implementation of the covering structure 10 does not hinder the normal use of the keyboard by those individuals who require visual reference to the keyboard. Along these lines, it should be noted that other structural portions of the cover structure 10 may also be formed of a transparent material or of some type of translucent or opaque material as design preferences suggest.

With regard to the embodiment of FIG. 2, the cover structure 10, also includes a plurality of support members 22 and 24 located at opposite ends of the cover structure. However, the cover structure 10' of FIG. 2 includes a back wall generally indicated as 40 of substantially solid construction. The opposite ends as at 42 and 44 may further add to the stability of the overall structure by serving as support members in addition to the end supports 22 and 24. The back wall 40 extends downwardly from the outermost edge 20' of the rear segment 20 of top portion 16. Furthermore, while the front face as at 30 is still defined by an open configuration or construction to allow clear access to the interior of the cover structure 10', back wall 40 is substantially closed. However, back wall 40 does preferably include an opening at least partially defined by the elongated edge or periphery of the back wall being spaced upwardly above the support surface on which the keyboard 12 may be mounted. This opening allows the passage of any type of electrical conduit or connector used to operatively interconnect the keyboard to the remaining components of the computer. Such conductor is indicated as 14 in FIG. 1.

Figure 3:
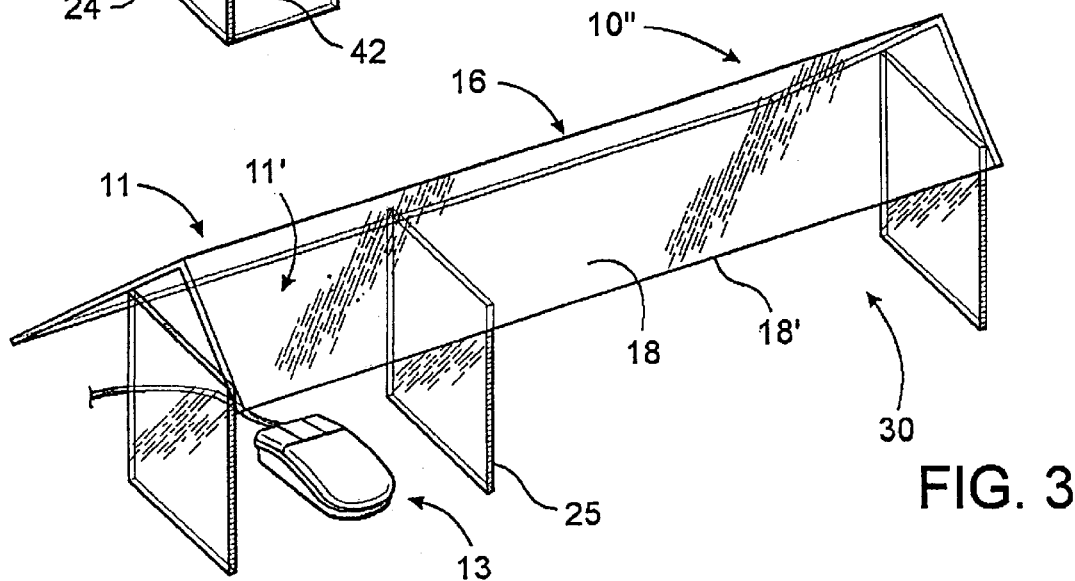
FIG. 3 in a perspective view of the protector assembly of the present invention including an auxiliary area in position overlying a conventional mouse.

Lastly, looking to FIG. 3, the protective assembly of the present invention may also include an auxiliary area 11 disposed generally adjacent the cover structure 10". The auxiliary area 11 is structured to receive a mouse or like control item movably thereunder. As such, an animal will also not be able to hinder the movement of the mouse 13 or auxiliary control item during its use or non-use. Preferably, the auxiliary area 11 will also include a top portion 11' structured to prevent an animal from being disposed thereon for any extended periods of time. In this regard, the top portion 11' may be peaked or otherwise constructed to make sitting or walking thereon by an animal difficult or uncomfortable. Moreover, while the auxiliary area 11 may be separate from the cover structure 10", in the preferred embodiment, both are integrally formed with one another, and indeed, the auxiliary area 11 may be defined by the cover structure 10" itself. Also, a partition 25 may or may not be provided between the cover structure 10" and the auxiliary area 11 as desired by the user. As to the top portion 11' of the auxiliary area 11, it may be opaque and/or partially or completely transparent to permit viewing therethrough, depending upon the design needs of the user.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents. For example, it is noted that as an alternative embodiment, the top portion may include a variety of protruding elements thereon in order to restrict an animal from resting thereon and/or to achieve other functional objectives.

Now that the invention has been described,

What is claimed is:

1. A protector assembly for a computer keyboard, said assembly comprising:
    a cover structure, said cover structure including a support assembly structured to dispose said cover structure in a covering position relative to the computer keyboard,
    said cover structure further including a top portion, said top portion being disposed in a covering, spaced apart relation over the computer keyboard so as to allow manipulation of the computer keyboard by a user's hands when said cover structure is in said covering position over the computer keyboard;
    means to prevent an animal from remaining thereon in obstructing relation to the computer keyboard, said means comprising said top portion including a peaked configuration, a peak defined by said peaked configuration being disposed generally above an operative portion of the computer keyboard and defining a slope on opposite sides thereof; and
    said support assembly including at least one support member formed of a sturdy construction which generally resists a downward weight exerted thereon.

2. A protector assembly as recited in claim 1 wherein said top portion includes an at least partially transparent configuration so as to permit substantially complete viewing of the computer keyboard therethrough.

3. An assembly as recited in claim 1 wherein said top portion comprises at least one segment disposed in overlying relation to the keyboard, said one segment being structured and disposed to allow viewing of substantially the entire keyboard therethrough when said cover structure is in the covering position.

4. An assembly as recited in claim 3 wherein said one segment is formed at least in part of a transparent material.

5. An assembly as recited in claim 1 wherein said support assembly comprises two end portions each disposed at an opposite end of said cover structure, each end portion including a lower extremity structured and disposed to engage a support surface and an upward extremity disposed in supporting attachment to said top portion.

6. An assembly as recited in claim 5 wherein said two end portions each define an opposite end wall of said cover structure and are dimensioned to extend along at least a majority of the width of said cover structure.

7. An assembly as recited in claim 6 wherein said cover structure includes a backside having an at least partially open configuration of sufficient dimension to allow passage therethrough of a cable connecting the keyboard to other components.

8. An assembly as recited in claim 7 wherein at least one portion of said backside defines a portion of said support assembly and includes one end thereof disposed in engagement with the support surface, said one portion extending upwardly from the support surface into supporting relation to the top portion.

9. An assembly as recited in claim 1 wherein said top portion comprises at least a first and a second segment extending along the length of said cover structure, said first and second segments of said top portion disposed at an angular orientation relative to one another to define a nonplanar, outer surface of said top portion and thereby further defining said means to prevent an animal from remaining thereon in obstructing relation to the computer keyboard.

10. An assembly as recited in claim 9 wherein said first segment extends along a length of a frontal area of said top portion in substantially overlying relation to a front face of said cover assembly.

11. An assembly as recited in 10 wherein at least a portion of said first segment includes a viewing area structured to permit viewing of an underlying area therethrough when said cover structure is in said covering position.

12. An assembly as recited in 11 wherein said first segment is formed of transparent material.

13. An assembly as recited in 1 further including an auxiliary area disposed generally adjacent said cover structure, said auxiliary area structured and disposed to receive a mouse movably and shieldably disposed thereunder.

14. An assembly as recited in 13 wherein said auxiliary area is integrally defined with said cover structure.

15. A protector assembly for a computer keyboard, said assembly comprising:
    a cover structure, said cover structure including a support assembly structured to dispose said cover structure in at least partially overlying relation to the computer keyboard,
    said cover structure further including a top portion, said top portion being disposed in a covering, spaced apart relation over the computer keyboard so as to allow manipulation of the computer keyboard by a user's hands when said cover structure is in said overlying relation to the computer keyboard;
    said top portion being further structured to permit substantially complete visibility of the computer keyboard by the user during manipulation of the computer keyboard;
    means to prevent an animal from remaining thereon in obstructing relation to the computer keyboard, said means comprising said top portion including a peaked configuration, a peak defined by said peaked configuration being disposed generally above an operative portion of the computer keyboard and defining a slope on opposite sides thereof; and said support assembly including a generally strong, sturdy support segment.

16. An assembly as recited in claim 15 wherein said top portion comprises a plurality of panel segments disposed in angular orientation to one another to define a non-planar outer surface configuration of said top portion.

17. As assembly as recited in claim 16 wherein said plurality of panel segments include a front panel formed at least partially from transparent material and extending in direct overlying relation to the keyboard along at least a majority of the length of the keyboard and in over hanging relation to a front face of said cover assembly.

* * * * *